UNITED STATES PATENT OFFICE.

FRANK G. PERKINS, OF SOUTH BEND, INDIANA; GERTRUDE S. PERKINS, EXECUTRIX OF SAID FRANK G. PERKINS, DECEASED, ASSIGNOR TO PERKINS GLUE COMPANY, A CORPORATION OF PENNSYLVANIA.

PROCESS FOR MAKING GLUE.

1,020,656.   Specification of Letters Patent.   Patented Mar. 19, 1912.

No Drawing.   Application filed November 2, 1908. Serial No. 460,738.

*To all whom it may concern:*

Be it known that I, FRANK G. PERKINS, a citizen of the United States, and a resident of South Bend, county of St. Joseph, and State of Indiana, have invented certain new and useful Improvements in Processes for Making Glue, of which the following is a specification.

My invention relates to improvements in processes for making glue and is more especially directed to improvements and modifications in my invention described in my copending application Serial No. 460,737. As there described my improvements relate to the manufacture of glue from carbohydrates and more particularly those of the starchy variety.

As a base upon which to operate, I find that the carbohydrate secreted by the cassava plant has many advantages over other starches and accordingly I preferably use this, although other substances may be used to some advantage. In my copending application above cited, I have described an improved method of making glue from this cassava carbohydrate by first treating it with an acid and heat to decrease its water absorptive properties, etc. In the present application I disclose an improved and modified method for similarly lessening the water absorptive properties of the corbohydrate which may be applied without the use of heat and in such a manner that even less damage is done to the carbohydrate and has the peculiar advantages that its action may be more accurately governed, is not so likely to cause dextrinization or solution of the carbohydrate, and the residual chemicals if left in the glue base are of a character to coöperate with instead of counteracting the solution of the glue base in the alkali in the second stage of the process as preferably performed.

Further objects, features and advantages will more clearly appear from the detail description given below.

As an illustration of my process, I preferably take the cassava carbohydrate in dry form and mix with it a small amount of water and provide agitation. To this batch I then add preferably from $\frac{1}{4}\%$ to 1% by weight of sodium peroxid in the form of a solution of substantially 20 parts of water to one part of peroxid by weight. Shortly before or after this treatment I also add $\frac{1}{4}\%$ to $\frac{1}{2}\%$ by weight of caustic soda in the form of a solution of about 10 parts of water to one part of caustic by weight. These proportions of reagents are based upon the weight of dry materials. This mixture is more or less continuously agitated for about twelve hours, but without the application of heat. The batch is then removed, and dried, and is made ready for shipment to the consumer in dry form, if it is not to be used at the place where made. The glue base is preferably left in this condition until just before it is desired to use it when it is treated in accordance with the second part of my process. The dry material obtained from the first part of my process is mixed with preferably from two to three parts by weight of water, according to the economy and strength of glue joint desired. A liquid suspension is thus formed which is agitated and treated with a reagent which will act to dissolve the material. I believe the result is a colloidal solution. For this purpose I preferably use an aqueous solution of caustic soda or potash, using from six to ten per cent. of the weight of the dry powder, of dry caustic soda or equivalent of caustic potash. The alkali is best added in the form of a solution of from 33% to 50% strength.

When ordinary starch is heated with water with a caustic alkali, it tends to absorb enormous quantities of water and when two to three parts of water are used it forms into a stiff jelly which must be very much diluted before it will be practically workable. I find, however, that by first treating it with sodium peroxid and caustic the starch can be made fluid with only a small quantity of water and the jelly effect will be obviated. The action of the peroxid and alkali in the first step of the process does not render the starch of the cassava flour soluble in water but merely decreases its water absorptive properties. The dry powder, which results from the first step of my process is therefore substantially insoluble in water, but is put into solution by the alkali of the second step of my process. These results, I believe, are largely due to the action upon the granulose or cellulose or both in the carbohydrate, so changing it that it will no longer absorb the large quantities of water, as before. Furthermore, the peroxid of soda and alkaline solution are exceptionally well adapted for reducing the water absorptive power of the carbohydrate since they do very little damage to the material and their action is not so potent and detrimental as that of the stronger acids and the process is much more reliable. By their use, therefore, the binding strength of the material is not reduced and an exceptionally fine glue results which will not only be amply fluid for easy application and which may be kept for days or even weeks after it has been made into a liquid state, but which is exceptionally strong and tenacious.

I believe that the action of the sodium peroxid upon the carbohydrate is one of oxidation or change of polymerization and hence other reagents may well be used in its stead. Also I find that it is not necessary to treat the carbohydrate with sodium peroxid and alkali at exactly the same time but that good results will be obtained even if the carbohydrate is treated with either one for a few minutes or even an hour before it is treated with the other. I believe, however, that to obtain the best results the carbohydrate should at least be treated with one in the presence of the other, or in such a manner that the other will be capable of carrying out its functions.

My improved glue is transparent and free from odor, and is very stable after mixing for use. Although in the final glue the starch is dissolved in the caustic, the starch is still in such a condition that it is insoluble in water. Such a glue will produce joints which are unaffected by moisture. These features make my glue especially advantageous for purposes in which other glues are practically useless.

The action of the alkaline material on the starch decreases its water absorptive properties in the sense that it takes less water to render the resulting glue semi-fluid so that it can be applied by machinery. Thus by the action of the alkaline material on the starch the viscosity, adhesiveness and cohesiveness of the resulting glue is properly proportioned.

Although I have described my improvements with great detail and have mentioned the particular compounds which I prefer to use, I do not desire to be limited to such details and compounds, as many substitutes therefor may be found, but Having fully and clearly described my improvements, what I claim and desire to secure by Letters Patent, is:

1. The process of making a glue base which consists in agitating cassava carbohydrate with water, sodium peroxid, and caustic soda whereby the polymerization of the carbohydrate is altered.

2. The process of making a glue base which consists in treating a starchy carbohydrate or its equivalent with water and an alkaline digesting agent until the water absorptive properties of the carbohydrate are decreased and the viscosity, adhesiveness and cohesiveness resulting when the base is dissolved to form glue are properly proportioned for application of the glue by machinery.

3. In the manufacture of adhesives from carbohydrates, the treating of cassava starch with water, then adding peroxid of soda in the form of a solution, and also simultaneously treating it with a solution of caustic and agitating the same.

4. In the manufacture of glue from carbohydrates, the treating of cassava carbohydrate with water, containing from $\frac{1}{4}\%$ to $1\%$ by weight of peroxid of soda in the form of a solution of substantially 20 parts of water to one part of peroxid by weight and also treating it with from $\frac{1}{4}\%$ to $\frac{1}{2}\%$ of a caustic alkali in the form of a solution of substantially 10 parts of water to one part of alkali by weight.

5. In the making of glue, the treating of starch with sodium peroxid and caustic in water, then neutralizing the caustic, then drying and finally treating with a solution of caustic to form an alkaline glue.

6. In the process of making a wood glue, the combination of the following steps, agitating a starchy carbohydrate or its equivalent with an alkaline digesting agent until its water absorptive properties are decreased to a point to properly proportion the viscosity, adhesiveness and cohesiveness resulting when the base is dissolved to form a glue as distinguished from mucilages, sizes and pastes and then dissolving the carbohydrate to form glue.

7. The process of making a wood glue which consists in agitating a starchy carbohydrate or its equivalent with a solution of sodium peroxid and caustic soda to decrease the water absorptive properties of the carbohydrate without rendering the carbohydrate materially soluble in water to properly proportion the viscosity, adhesiveness and cohesiveness resulting when the carbohydrate is dissolved to form glue and dissolving the product thus produced with caustic soda or its equivalent and about 3 parts of water or less to produce a glue for application.

8. The process of making a wood glue which consists in treating a suitable carbohydrate with an alkaline oxidizing material to properly proportion the viscosity, adhesiveness and cohesiveness resulting when the carbohydrate is dissolved to form a glue, and then dissolving the carbohydrate in about 3 parts of water or less to form a wood glue.

9. The process of making glue which consists in treating a suitable amylaceous material in two stages, in the first stage treating it with sodium peroxid or its equivalent and caustic soda or its alkali equivalent, and in the second stage treating with caustic soda or its equivalent to form an alkaline wood glue.

In testimony whereof, I have signed my name to this specification, in the presence of two subscribing witnesses.

FRANK G. PERKINS.

Witnesses:
GORHAM CROSBY,
EDWIN SEGER.